June 28, 1932. L. C. DANIELS 1,865,236

COIL WINDING MACHINE

Original Filed June 25, 1929

Inventor:
Leon C. Daniels,
by Charles E. Tullar
His Attorney.

Patented June 28, 1932

1,865,236

UNITED STATES PATENT OFFICE

LEON C. DANIELS, OF PITTSFIELD, MASSACHUSETTS, ASSIGNOR TO GENERAL ELECTRIC COMPANY, A CORPORATION OF NEW YORK

COIL WINDING MACHINE

Application filed June 25, 1929, Serial No. 373,633. Renewed February 4, 1932.

My invention relates to coil winding machines and has for its object the provision of an improved machine of this character whereby the coil may be more compactly and uniformly wound.

More specifically my invention relates to winding machines for winding electrical conductors into coils. My invention is particularly applicable to the winding of transformer coils and the like.

In order to make a more compact and uniform winding, it is common to wind each turn along a circumference of the spool rather than in the form of a helix. When winding coils in this manner, the conductor is shifted at the end of each turn into the next succeeding turn and at the end of each layer the shifting movement is reversed for the next layer. When the turns of each layer are wound in the gutters between the turns of the preceding layer, as when using the coil winding machine described and claimed in the U. S. patent granted to J. J. Vienneau, No. 1,504,004 and dated August 5, 1924, the cross-overs from one turn to the next form a raised portion along one side of the coil, making the coil lopsided.

In carrying out my invention in one form thereof, I provide means for controlling the motion of the spool so as to bring the cross-overs of successive layers at different portions of the periphery of the spool, thus making a uniform and symmetrical winding.

Figure 1:
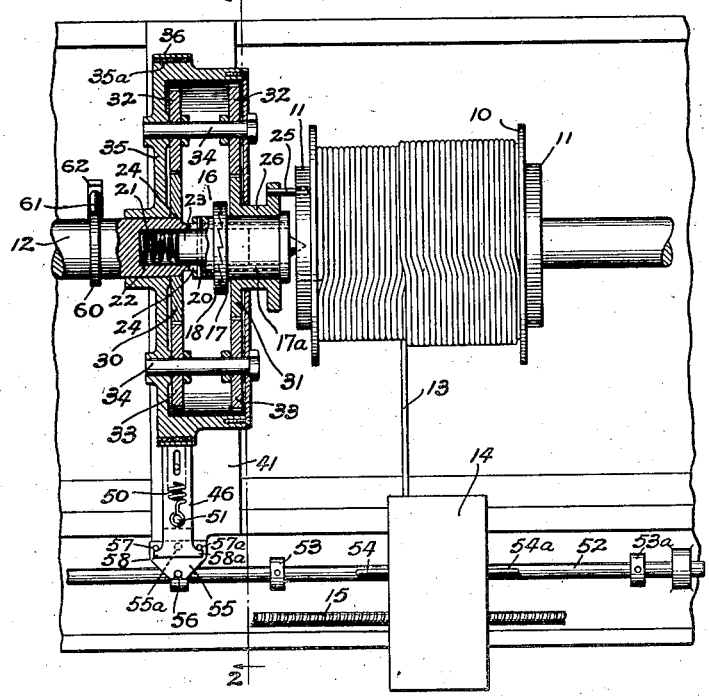
Figure 2:
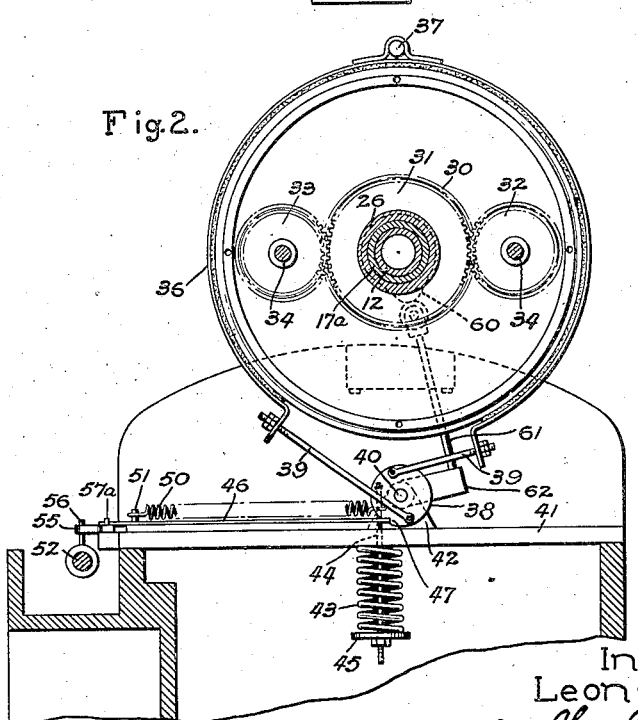

For a more complete understanding of my invention reference should be had to the accompanying drawing, in which Fig. 1 is a plan partly in section of a portion of a winding machine which embodies my invention; and Fig. 2 is a section taken through the line 2—2 of Fig. 1.

Referring to the drawing, I have shown my invention as applied to a coil winding machine such, for example, as described and claimed in the aforementioned U. S. patent granted to J. J. Vienneau. Obviously, however, my invention may be applied to various types of coil winding machines. In the specific mechanism shown, the spool 10 is carried on a suitable winding arbor 11 which is driven by a shaft 12. It will be understood that the shaft 12 will be rotated by a suitable source of power not shown. As shown, the spool 10 is releasably secured to the arbor so that it may be removed upon completion of the winding operation. The electrical conductor 13 or other material is provided with a suitable distributor 14 which guides the conductor so that it is wound in layers on the spool 10 as it is rotated.

The distributor 14 is commonly moved by an amount equal to the diameter of the conductor upon the completion of each turn whereby the conductor is shifted into the next turn, each turn lying in a plane perpendicular to the axis of the coil, i. e., along a circumference of the coil. This periodic shifting movement is transmitted to the distributor 14 by suitable means comprising a screw shaft 15. It will be understood that in the winding operation the spool 10 will be rotated and the screw shaft 15 will be controlled so that the conductor will be formed into a gutter-wound cross-over electrical coil, that is, each turn will be wound in the gutter of the preceding layer and the conductor at the end of each turn will be shifted into the succeeding turn. Moreover at the end of each layer the shifting movement will be reversed for the next layer. Thus the cross-overs of the various layers will be formed into rows which extend lengthwise of the spool in parallel relation both with each other and with the axis of the spool. Obviously, however, these lengthwise rows need not be parallel with the axis of the spool but may be of helical form. It is believed to be unnecessary for a proper understanding of this invention to describe in detail the mechanism for operating and controlling the rotation of the shafts 12 and 15.

As has been pointed out, when using the winding machine described and claimed in the aforementioned Vienneau patent for winding gutter-wound coils, the cross-overs will form a raised portion along one side of the coil. This is due to the fact that the cross-overs are all made at the same point along the periphery of the coil and hence pile up one above the other. In order to form a uniform and symmetrical winding, I have provided means for automatically giving the spool 10 a slight movement each revolution relative to the shaft 12. To this end, I have interposed a suitable driving connection between the spool 10 and its driving shaft 12 so that the velocity of rotation of the spool will be increased temporarily upon the completion of each layer. As shown, this driving connection comprises a suitable clutch 16 which while effecting a driving connection between the shaft and the spool for one direction of rotation, will permit relative movement between the shaft and spool in the opposite direction. As shown, the clutch 16 is of the jaw type and comprises a clutch member 17, which is rotatably mounted on the end portion of the shaft 12, and a cooperating clutch member 18 which is mounted upon the shaft 12 but is secured against rotation thereon by means of a pin 20. The clutch member 18 is normally biased into engagement with its cooperating clutch member 17 by means of a compression spring 21. This spring is mounted within a suitable recess 22 formed in the end portion of the shaft between the closed end of the recess and a spring bearing member 23. As shown, the pin 20 in addition to securing the clutch member 18 to the shaft, serves to mechanically connect this clutch member with its spring bearing member 23. It will be observed that the hollowed end of the shaft 12 is provided with a pair of recesses 24 for receiving the pin 20 so that the clutch member 18 will be allowed to move longitudinally of the shaft away from its cooperating clutch member 17.

The clutch member 17 is mechanically connected with the arbor 11 by means of a driving pin 25 which, as shown, is mounted upon a flanged collar 26. This collar is keyed or otherwise fixedly mounted upon the sleeve portion 17a of the clutch member 17. By reason of this construction rotative motion of the shaft 12 in a counterclockwise direction, as viewed in Fig. 2, will drive the spool 10 so as to wind the conductor 13 thereon.

The driving connection between the shaft 12 and spool 10 further comprises a differential gear train which is controlled responsively to the completion of each layer so that the velocity of rotation of the spool 10 will be increased temporarily. Preferably, I control the operation of the gear train in direct response to the movement of the distributor 14. As shown, this differential gear train is of the spur gear type and comprises a driving gear 30 fixedly secured to the shaft 12, a driven gear 31 keyed or otherwise secured against rotation upon the clutch sleeve portion 17a, and two pairs of gears 32 and 33 which serve to mechanically connect the driving gear 30 with the driven gear 31. Each pair of interconnecting gears 32, 33, is keyed or otherwise secured to a suitable shaft 34 which is supported in a differential housing 35. As shown this housing is mounted upon the shaft 12 so that it may rotate freely thereon. During normal operation, i. e., while a layer is being wound, the differential gear will perform no function, and the spool 10 will be driven by the shaft 12 through the medium of the jaw clutch 16.

As stated before, I control the gear train responsively to the completion of each layer, more specifically, responsively to the motion of the distributor 14. To this end I provide a suitable braking mechanism for the differential housing 35, and apply the brake responsively to the motion of the distributor. It will be understood that if the differential housing be secured against rotation, rotative motion will be transmitted from the shaft to the spool through the differential gear train. It will be observed that the gears are so proportioned that when the differential housing is braked, the driven gear 31 will be rotated at a higher speed than the driving gear 30 and hence at a higher speed than the shaft 12. As a result while the differential housing is braked, the spool 10 will have a higher speed of rotation than its driving shaft 12 and will be advanced angularly with respect to the shaft. As has been pointed out the clutch 16 will permit a relative rotation between the spool and its shaft. Thus the clutch member 18 will be forced away from the clutch member 17 against the force of the spring 21 by the cam action of the cooperating teeth.

As shown, the brake comprises a suitable brake band 36 which substantially surrounds the outer periphery of a brake drum 35a provided on the differential housing. This brake band is secured by a brace 37 which may be secured to the winding machine in any suitable manner (not shown). Each end of the brake band 36 is mechanically connected to a wrist plate 38 by means of a rod 39. The wrist plate 38 is fixedly mounted upon a shaft 40 which is supported upon the frame plate 41 by means of a suitable bearing bracket 42. It will be observed that the connection between the ends of the brake band 36 and the wrist plate 38 is such that clockwise rotation, as viewed in Fig. 2, of the wrist plate 38 will release the brake, while counterclockwise rotation of the wrist plate will apply the brake. The wrist plate 38 is normally biased in a counter clockwise direction by means of a compression spring 43 which is mechanically connected to the wrist plate by means of a link 44 and an abutment 45. It will be observed that the compression spring is interposed between the frame plate 41 and the abutment 45 and moreover that the link 44 is secured to the wrist plate on a radius at the left of the shaft 40, as viewed in Fig. 2. It will be obvious that by reason of this construction the force exerted by the spring 43 tends to move the wrist plate to apply the brake.

The brake, however, is normally locked or secured in its released position by means of a latch 46 which engages a notch 47 provided in the wrist plate 38. The latch 46 is normally held in engagement with the notch 47 by means of a tension spring 50 which, as shown, is secured at one of its ends to the latch 46 by means of a pin 51 and is anchored at its other end to the bearing bracket 42. This latch is controlled to release the wrist plate in response to the completion of each layer. For this purpose, a shaft 52 is slidably mounted upon the winding machine in a position substantially parallel with the axis of the spool. This shaft 52 is provided with a pair of abutments 53, 53a which are engaged respectively by suitable rods 54, 54a provided on the distributor 14, as the distributor approaches the corresponding ends of its path of travel.

The shaft 52 is mechanically connected to the latch 46 by means of a wrist plate 55 which is mounted upon the plate 41 by means of a pin 55a, this wrist plate being mechanically connected to the shaft 52 by means of a pin and slot connection 56. As shown, the wrist plate 55 is provided with a pair of pins 57, 57a, which are arranged to engage with ears 58, 58a, respectively, provided on the latch member. It will be observed that by reason of this construction, longitudinal movement of the shaft 52 in either direction will swing the wrist plate 55 about its pin 55a, which operation will move the latch 46 to release the wrist plate 38. When the wrist plate is thus released, the brake will be applied by means of the compression spring 43. Thus, upon the completion of each layer of the coil the brake will be applied to bring the differential housing 35 to rest.

In order to release the brake after it has been applied in response to the completion of a layer, I provide suitable means for moving the wrist plate 38 in a clockwise direction, as viewed in Fig. 2. As shown, I provide a suitable cam 60 on the shaft 12 which operates through the medium of a push rod 61 and a lever 62, which is secured to the shaft 40, to move the wrist plate in a direction to release the brake.

The operation of the winding machine is as follows: Assume that the shaft 12 is rotating the spool 10 so as to wind the conductor 13 into a layer which is being completed towards the left of the spool, as shown in Fig. 1. It will be understood that during this operation the differential housing 35 will be rotating freely upon the shaft 12 and that the clutch members 17 and 18 will be interengaged so as to drive the spool 10. Moreover, it will be understood that the wrist plate 38 will be locked so that the brake band will be secured in its released position. Upon the completion of the layer being wound, the rod 54 will engage the abutment 53 and as a result the shaft 52 will be moved towards the left, which movement, as has been pointed out, will release the wrist plate 38 so that the brake will be applied under the influence of the compression spring 43. As soon as the brake has been applied, the differential housing, of course, will be brought to rest and the velocity of the spool 10 will be increased temporarily, by reason of the operation of the differential gear train. It will be understood from the foregoing description that the spool 10 will be rotated slightly ahead of the shaft 12 and that the row of cross-overs of the next layer will be brought to a different portion of the periphery of the spool. Preferably, the spool will be advanced angularly a distance equivalent to an advance of one tooth of the clutch 16.

A fraction of a revolution of the shaft 12 after the brake has been applied, will bring the cam 60 into engagement with the push rod 61 so as to move the wrist plate 38 against the force of the spring 43 to release the brake. The latch 46 will then be moved into engagement with the notch 47 by means of the tension spring 50. It will be understood that the latch will have been released by the distributor which will be moving in its reverse direction. Moreover, it will be understood that the tension spring 50 will have sufficient strength to center the wrist plate 55 when the wrist plate has been moved by the cam 60 to release the brake. It also will be understood, of course, that during normal operation, i. e. during the winding of a layer, the cam 60 performs no function. As soon as the differential housing 35 has been released, the spool 10 will be driven at the same velocity as the shaft 12 by reason of the fact that the clutch member 18 will be forced by the spring 21 into driving engagement with its cooperating clutch member 17.

The next layer will then be wound, a row of cross-overs being formed which will be parallel to the previous row of cross-overs but will be spaced therefrom along the circumference of the spool. Upon the completion of this layer the rod 53a will engage the abutment 54a to move the shaft 52 towards the right, as viewed in Fig. 1. Again the wrist plate 38 will be released so as to permit the brake to be applied by the spring 43. As before, after the brake has been applied temporarily, the cam 60 will effect a release of the brake to permit the differential housing to rotate freely; and as before the row of cross-overs of the succeeding layer will be spaced circumferentially with respect to the previous row of cross-overs.

It will be observed, therefore, that an electrical coil will be produced in which the rows of cross-overs will be parallel to each other and to the axis of the coil and will be substantially equally spaced about the periphery of the coil.

What I claim as new and desire to secure by Letters Patent of the United States, is:

1. A coil winding machine for winding electrical conductors and the like into cross-over electrical coils wherein the cross-overs of each layer form a row extending lengthwise of the coil and substantially parallel with its axis, comprising a spool, means for rotating said spool and means for changing the speed of rotation of said spool with respect to its rotating means only upon the completion of each layer so as to space said cross-over rows at intervals about the periphery of the spool.

2. A coil winding machine for winding electrical conductors and the like into cross-over electrical coils wherein the cross-overs of each layer are made at the same point along the periphery of the coil comprising a spool, means for rotating said spool and auxiliary means for changing the speed of said spool with respect to said rotating means only upon the completion of each layer so as to space the cross-overs of successive layers at intervals through said coil.

3. A coil winding machine for winding electrical conductors and the like into electrical windings comprising in combination with a spool, means for rotating said spool and for feeding said conductor along a circumference of said spool, means for shifting said feeding means from one turn to the next so as to form a cross-over, the cross-overs of each layer forming a row extending lengthwise of said spool, and auxiliary means for temporarily changing the speed of said spool with respect to its rotating means only upon the completion of each layer so as to space said cross-over rows at intervals through the winding.

4. A coil winding machine for winding electrical conductors and the like into electrical coils comprising a spool, operating means for rotating said spool, a distributor for feeding said conductor to said spool along a circumference thereof, means for shifting said distributor from one turn to the next so as to form a cross-over, the cross-overs of each layer forming a row extending lengthwise of said spool, and means for connecting said spool with said operating means comprising a clutch connected so that said spool can be driven in one direction by said operating means but is permitted to move with respect to said operating means in the opposite direction, a differential gear train interposed between said shaft and said spool and means dependent upon the motion of said distributor for controlling said gear train whereby said spool is rotated with respect to said operating means in said other direction upon the completion of each layer so as to distribute said cross-over rows at intervals through the winding.

5. A coil winding machine for winding electrical conductors and the like into cross-over electrical coils wherein the cross-overs of each layer form a row extending lengthwise of the coil comprising a spool, means for rotating said spool, and means for controlling the speed of rotation of said spool whereby the speed is increased temporarily only upon the completion of each layer so as to distribute said cross-over rows at intervals about the periphery of said spool.

6. A coil winding machine for winding electrical conductors and the like into gutter wound, cross-over electrical coils wherein the cross-overs of each layer form a row extending lengthwise of the coil and substantially parallel with its axis comprising a spool, means for rotating said spool and means for controlling the speed of rotation of said spool whereby its speed is increased temporarily upon the completion of each layer so as to distribute said cross-overs in substantially parallel equally spaced rows about the periphery of said spool.

7. A coil winding machine for electrical conductors and the like comprising a spool, means for feeding said conductor to said spool, a shaft for rotating said spool means for mechanically interconnecting said shaft and said spool so as to permit relative rotative movement between said spool and said shaft and means dependent upon the motion of said feeding means for controlling the rotation of said spool so that its speed of rotation with respect to said shaft is temporarily changed upon the completion of each layer.

8. A coil winding machine for electrical conductors and the like comprising a spool, a distributor for feeding said conductor to said spool whereby it is wound into a plurality of layers, a shaft for rotating said spool and means for mechanically connecting said spool to said shaft comprising a clutch connected so that said spool is free to rotate in one direction relative to said shaft and means responsive to the operation of said distributor for increasing the speed of rotation of said spool temporarily upon the completion of each layer.

9. A coil winding machine for winding electrical conductors and the like into cross-over electrical coils wherein the cross-overs of each layer form a row extending lengthwise of the coil comprising a spool, a distributor for feeding said conductor to said spool whereby the conductor is wound in a plurality of layers, a shaft for rotating said spool and means for mechanically connecting said spool with said shaft comprising a jaw clutch, a differential gear train interposed between said shaft and said spool and means dependent upon the motion of said distributor for controlling said gear train whereby the speed of rotation of said spool is increased temporarily upon the completion of each layer so as to distribute said cross-over rows about the periphery of said spool.

10. A coil winding machine for winding electrical conductors and the like into gutter wound cross-over electrical coils wherein the cross-overs of each layer form a row extending lengthwise of the coil and substantially parallel with its axis comprising a spool, a distributor for feeding said conductor to said spool whereby the conductor is wound into a plurality of layers, a shaft for rotating said spool, a jaw clutch interposed between said shaft and said spool whereby said spool is free to rotate in one direction relative to said shaft, a differential gear train interposed between said shaft and said spool comprising a driving gear secured to said shaft, a driven gear secured to said spool, a plurality of gears interconnecting said driving and driven gears, a differential housing for supporting said interconnecting gears mounted to rotate freely upon said shaft, a brake for said housing and means for applying said brake temporarily upon the completion of each layer so as to distribute said cross-overs in substantially parallel equally spaced rows about the periphery of said spool.

11. A coil winding machine for winding electrical conductors and the like into gutter wound, cross-over electrical coils wherein the cross-overs of each layer form a row extending lengthwise of the coil and substantially parallel with its axis comprising a spool, a distributor for feeding said conductor to said spool whereby the conductor is wound into a plurality of layers, a shaft for rotating said spool, a jaw clutch interposed between said shaft and said spool whereby said spool is free to rotate in one direction relative to said shaft, a differential gear train interposed between said shaft and said spool comprising a driving gear secured to said shaft, a driven gear secured to said spool, a plurality of gears interconnecting said driving and driven gears, a differential housing for supporting said interconnecting gears mounted to rotate freely upon said shaft, a brake for said housing, means for locking said brake in its released position and means dependent upon the completion of each layer for releasing said brake temporarily to increase the speed of said spool.

In witness whereof, I have hereunto set my hand this 21st day of June, 1929.

LEON C. DANIELS.